(12) United States Patent
Tolley et al.

(10) Patent No.: US 8,797,168 B2
(45) Date of Patent: Aug. 5, 2014

(54) HIGH RELIABILITY PEST DETECTION

(75) Inventors: Mike P. Tolley, Indianapolis, IN (US);
Joseph J. DeMark, Westfield, IN (US);
Donald E. Williams, III, Greenfield, IN (US); Thomas H. Atkinson, Austin, TX (US); Andrew H. Wurtz, Carmel, IN (US); Amy J. Griffin, New Palestine, IN (US); Eva A. Chin, Indianapolis, IN (US); Marc L. Fisher, Blacksburg, VA (US)

(73) Assignee: Dow AgroSciences, LLC., Indianapolis, IN (US)

( * ) Notice: Subject to any disclaimer, the term of this patent is extended or adjusted under 35 U.S.C. 154(b) by 206 days.

(21) Appl. No.: 13/364,374

(22) Filed: Feb. 2, 2012

(65) Prior Publication Data
US 2012/0126951 A1 May 24, 2012

Related U.S. Application Data

(63) Continuation of application No. 12/657,369, filed on Jan. 19, 2010, now Pat. No. 8,134,468, which is a continuation of application No. 12/002,801, filed on Dec. 18, 2007, now Pat. No. 7,671,750.

(60) Provisional application No. 60/875,778, filed on Dec. 19, 2006.

(51) Int. Cl.
| | | |
|---|---|---|
| G08B 23/00 | (2006.01) | |
| A01M 1/02 | (2006.01) | |
| A01M 1/20 | (2006.01) | |
| A01M 25/00 | (2006.01) | |
| A01M 31/00 | (2006.01) | |

(52) U.S. Cl.
CPC ............. *A01M 1/026* (2013.01); *A01M 1/2011* (2013.01); *A01M 25/006* (2013.01); *A01M 31/002* (2013.01)
USPC .................................. 340/573.2; 340/539.26; 340/572.7; 340/572.8; 340/652; 340/693.5; 43/107; 43/132.1; 43/121; 43/124

(58) Field of Classification Search
CPC .............. A01M 1/026; A01M 1/2011; A01M 2200/011; A01M 31/002; A01N 25/006; A01N 1/00; A01N 25/00; G08B 23/00; G01N 2333/43582; G01N 2333/43586; G01N 2333/43591
USPC ......... 340/573.1, 870.16, 652, 572.1, 539.26, 340/572.5–572.8, 639.5; 43/124, 132.1, 43/107, 133, 121; 235/385; 73/587, 365.8; 324/239; 361/600, 748
See application file for complete search history.

(56) References Cited

U.S. PATENT DOCUMENTS

| | | | |
|---|---|---|---|
| 3,564,750 A | | 2/1971 | Burgess |
| 3,616,153 A | * | 10/1971 | Downs .......................... 428/34.2 |

(Continued)

FOREIGN PATENT DOCUMENTS

| | | |
|---|---|---|
| EP | 0 283 142 A1 | 9/1988 |
| GB | 1 513 190 | 6/1978 |

(Continued)

OTHER PUBLICATIONS

XP-002167430, Jennifer Jurgens, "Development and Evaluation of an Inexpensive Sensor System for Use in Measuring Relative Finger Positions," vol. 19, Medial Engineering & Physics, Elsevier Science Ltd., Oxford, England, Jan. 1997. (Abstract only).

(Continued)

*Primary Examiner* — Hoi Lau
(74) *Attorney, Agent, or Firm* — Carl D. Corvin; Barnes & Thornburg LLP

(57) ABSTRACT

A pest detection device includes a housing with a sensor and one or more bait members. The sensor includes one or more of a chisel-shaped electrically conductive trace carried on a substrate, a low resistance electrically conductive ink defining an electrical pathway on a substrate with a pointed profile, and/or a substrate including a directional grain structure oriented in a predefined manner relative to an electrically conductive pathway.

16 Claims, 4 Drawing Sheets

(56) References Cited

U.S. PATENT DOCUMENTS

| | | |
|---|---|---|
| 3,778,805 A | 12/1973 | Gould |
| 3,836,842 A | 9/1974 | Zimmermann et al. |
| 4,074,456 A | 2/1978 | Tidwell |
| 4,105,971 A | 8/1978 | Nevalainen |
| 4,127,110 A | 11/1978 | Bullara |
| 4,136,338 A | 1/1979 | Antenore |
| 4,265,252 A | 5/1981 | Chubbuck et al. |
| 4,366,644 A | 1/1983 | Lawrence |
| 4,387,529 A | 6/1983 | Hedstrom |
| 4,455,441 A | 6/1984 | Prestwich |
| 4,472,904 A | 9/1984 | Wasielewski |
| 4,653,221 A | 3/1987 | Pratscher |
| 4,688,026 A | 8/1987 | Scribner et al. |
| 4,737,770 A | 4/1988 | Brunius et al. |
| 4,737,789 A | 4/1988 | Nysen |
| 4,862,145 A | 8/1989 | Meehan et al. |
| 4,951,057 A | 8/1990 | Nagel |
| 4,988,510 A | 1/1991 | Brenner et al. |
| 5,024,832 A | 6/1991 | Omata et al. |
| 5,134,892 A | 8/1992 | Wilson et al. |
| 5,209,233 A | 5/1993 | Holland et al. |
| 5,237,310 A | 8/1993 | Smith |
| 5,285,688 A | 2/1994 | Robbins et al. |
| 5,329,726 A | 7/1994 | Thorne et al. |
| 5,428,345 A | 6/1995 | Bruno |
| 5,429,735 A | 7/1995 | Johnson et al. |
| 5,528,222 A | 6/1996 | Moskowitz et al. |
| 5,564,222 A | 10/1996 | Brody |
| 5,571,967 A | 11/1996 | Tanaka et al. |
| 5,575,105 A | 11/1996 | Otomo |
| 5,592,774 A | 1/1997 | Galyon |
| 5,648,758 A | 7/1997 | Tweadey, II et al. |
| 5,661,651 A | 8/1997 | Geschke et al. |
| 5,739,514 A | 4/1998 | Uchida |
| 5,764,138 A * | 6/1998 | Lowe ............................ 340/447 |
| 5,815,090 A | 9/1998 | Su |
| 5,864,241 A | 1/1999 | Schreck et al. |
| 5,866,269 A | 2/1999 | Dalebroux et al. |
| 5,876,577 A | 3/1999 | McAleer et al. |
| 5,877,422 A | 3/1999 | Otomo |
| 5,892,444 A | 4/1999 | Wittmer et al. |
| 5,894,818 A | 4/1999 | Betzen |
| 5,910,776 A | 6/1999 | Black |
| 5,950,356 A | 9/1999 | Nimocks |
| 5,974,344 A | 10/1999 | Shoemaker, II |
| 5,974,726 A | 11/1999 | Creeger et al. |
| 5,986,570 A | 11/1999 | Black et al. |
| 6,016,625 A | 1/2000 | Bishoff et al. |
| 6,025,725 A | 2/2000 | Gershenfeld et al. |
| 6,100,805 A | 8/2000 | Lake |
| 6,111,520 A | 8/2000 | Allen et al. |
| 6,130,602 A | 10/2000 | O'Toole |
| 6,150,944 A | 11/2000 | Martin et al. |
| 6,178,834 B1 | 1/2001 | Cates |
| 6,243,014 B1 | 6/2001 | Lake et al. |
| 6,255,959 B1 | 7/2001 | Lake et al. |
| 6,281,799 B1 | 8/2001 | Lake et al. |
| 6,304,185 B1 | 10/2001 | Tuttle et al. |
| 6,313,748 B1 | 11/2001 | Luke |
| 6,339,897 B1 | 1/2002 | Hayes et al. |
| 6,370,812 B1 | 4/2002 | Burns et al. |
| 6,397,516 B1 | 6/2002 | Su |
| 6,404,210 B1 * | 6/2002 | Su ................................ 324/692 |
| 6,515,591 B2 | 2/2003 | Lake et al. |
| 6,537,407 B1 | 3/2003 | Law et al. |
| 6,630,887 B2 | 10/2003 | Lake |
| 6,724,312 B1 | 4/2004 | Barber et al. |
| 6,914,529 B2 | 7/2005 | Barber et al. |
| 6,937,156 B2 | 8/2005 | Gardner, Jr. et al. |
| 7,212,112 B2 | 5/2007 | Barber et al. |
| 7,212,129 B2 | 5/2007 | Barber et al. |
| 7,262,702 B2 | 8/2007 | Barber et al. |
| 7,348,890 B2 | 3/2008 | Barber et al. |
| 7,671,750 B2 * | 3/2010 | Tolley et al. ............... 340/573.2 |
| 8,134,468 B2 * | 3/2012 | Tolley et al. ............... 340/573.2 |
| 2001/0001236 A1 | 5/2001 | Lake |
| 2001/0004237 A1 | 6/2001 | Lake et al. |
| 2001/0009399 A1 * | 7/2001 | Barber et al. ............. 340/573.2 |
| 2001/0033230 A1 | 10/2001 | Barber et al. |
| 2003/0020584 A1 * | 1/2003 | Lee ............................. 336/200 |
| 2007/0120690 A1 | 5/2007 | Barber et al. |
| 2008/0055094 A1 | 3/2008 | Barber et al. |
| 2008/0083746 A1 | 4/2008 | Lucas et al. |
| 2008/0138129 A1 | 6/2008 | Lucas et al. |

FOREIGN PATENT DOCUMENTS

| | | |
|---|---|---|
| JP | 7-43460 | 2/1995 |
| JP | 9-26320 | 1/1997 |
| JP | 9-98701 | 4/1997 |
| JP | 10-56935 | 3/1998 |
| JP | 10-84834 | 4/1998 |
| JP | 10-105861 | 4/1998 |
| JP | 11-239440 | 9/1999 |
| WO | WO 93/23998 | 12/1993 |
| WO | WO 98/46071 | 10/1998 |
| WO | WO 00/79243 | 12/2000 |
| WO | WO 01/06851 A1 | 2/2001 |
| WO | WO 02/26033 A1 | 4/2002 |
| WO | WO 03/013237 A2 | 2/2003 |
| WO | WO 03/079779 A1 | 10/2003 |

OTHER PUBLICATIONS

XP-002167431, Miyauchl Shin'nosuke, Ohmiya Yukio, Yokotsuka Masatoshi, Ohkita Kumakazu, "Electrical Properties of Carbon Slack-Graftpolymers Crosslinked with Peroxide-Divinyl Monomer System," vol. 25, J Soc Mater Sci Jpn, Oct. 1976. (Abstract only).

XP-002167432, RL Rosenbaum, "A Survey of Some Secondary Thermometers for Possible Applications At Very Low Temperatures," vol. 41, Rev Sci Instrum, Jan. 1970. (Abstract only).

Sentricon Colony Elimination System; Dow AgroSciences; Mar. 26, 1999.

"Charge Transfer Sensing" by Hal Philipp; Copyright © 1997.

Passive RFID Device with Sensor Input; MCRF202; Microchip Technology Inc.; Copyright © 1999.

DS2405 Addressable Switch, Dallas Semiconductor, Jul. 2002.

* cited by examiner

HIGH RELIABILITY PEST DETECTION

CROSS-REFERENCE TO RELATED APPLICATIONS

The present application is a continuation of U.S. patent application Ser. No. 12/657,369 filed on Jan. 19, 2010 now U.S. Pat. No. 8,134,468, which is a continuation of U.S. patent application Ser. No. 12/002,801 filed Dec. 18, 2007, now U.S. Pat. No. 7,671,750, which claims the benefit of U.S. Provisional Patent Application No. 60/875,778 filed 19 Dec. 2006, each of which is incorporated herein by reference in its entirety.

BACKGROUND

The present invention relates to data gathering and sensing techniques, and more particularly, but not exclusively, relates to techniques for gathering data from one or more pest control devices.

The removal of pests from areas occupied by humans, livestock, and crops has long been a challenge. Pests of frequent concern include various types of insects and rodents. Subterranean termites are a particularly troublesome type of pest with the potential to cause severe damage to wooden structures. Various schemes have been proposed to eliminate termites and certain other harmful pests of both the insect and noninsect variety. In one approach, pest control relies on the blanket application of chemical pesticides in the area to be protected. However, as a result of environmental concerns, this approach is becoming less desirable.

Consequently, various techniques for detecting pest presence before pesticide application have arisen. Nonetheless, there is an ongoing desire to more definitively sense the activity of termites and other pests using such techniques under various environmental conditions—leading to a continuing need for further advancement in this technical arena. Notably, some sensing devices involve long-term in-ground installation outdoors, subjecting such devices to changing environmental conditions. It has been found that these changes can lead to device failures—especially false positive indications. Indeed, a need exists for techniques to detect pests that are more reliable and less likely to give false readings.

SUMMARY

One embodiment of the present invention includes a unique sensing technique applicable to pest control. Other unique embodiments include unique methods, apparatus, devices, and systems to more reliably detect pests. Further embodiments, forms, aspects, features, and objects of the present invention shall become apparent from the drawings and description contained herein.

DETAILED DESCRIPTION OF REPRESENTATIVE EMBODIMENTS

Figure 1:
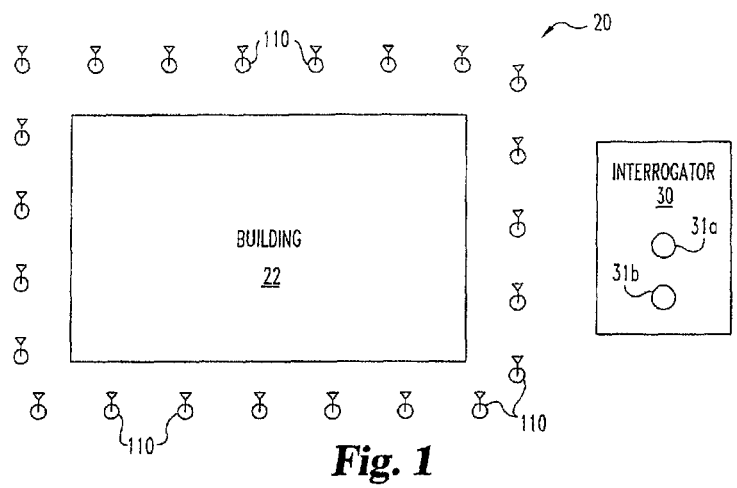
FIG. 1 is a diagrammatic view of a pest control system that includes an interrogator and several pest control devices installed in the ground.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

FIG. 1 illustrates pest control system 20 of one embodiment of the present invention. System 20 is arranged to protect building 22 from damage due to pests, such as subterranean termites. System 20 includes a number of pest control devices 110 positioned about building 22. In FIG. 1, only a few of devices 110 are specifically designated by reference numerals to preserve clarity. System 20 also includes an interrogator 30 operational to electrically communicate with devices 110 to gather information about devices 110. In one embodiment, data gathered from devices 110 with interrogator 30 is displayed using indicators 31a and 31b—each being activated to show a different state of device 110 corresponding to whether pests are present or not. Interrogator 30 may communicate with peripheral equipment in a wireless manner to transmit results to a computer-based system.

Figure 2:
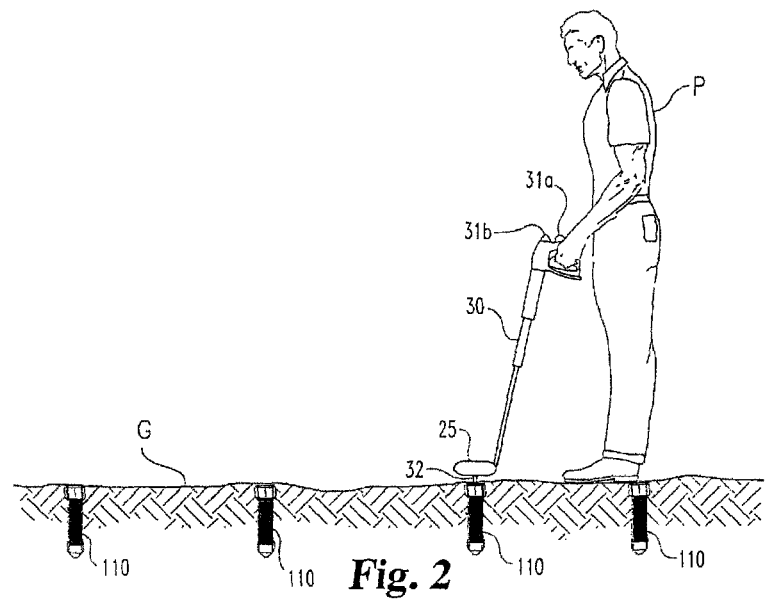
FIG. 2 is a view of selected elements of the system of FIG. 1 in operation.

Referring additionally to FIG. 2, certain aspects of the operation of system 20 are illustrated. In FIG. 2, pest control service provider P is shown operating interrogator 30 to interrogate pest control devices 110 located at least partially below ground G. In one example, interrogator 30 is a hand-held form convenient for sweeping over ground G to establish wireless communication with installed devices 110. In an alternative example, as set forth in greater detail below, interrogator 30 may include contacts 32 that temporarily engage pest control devices 110 to electrically couple therewith in order to interrogate pest control devices 110. A head 25 of interrogator 30 may house contacts 32 as well as other operative structure.

Figure 3:
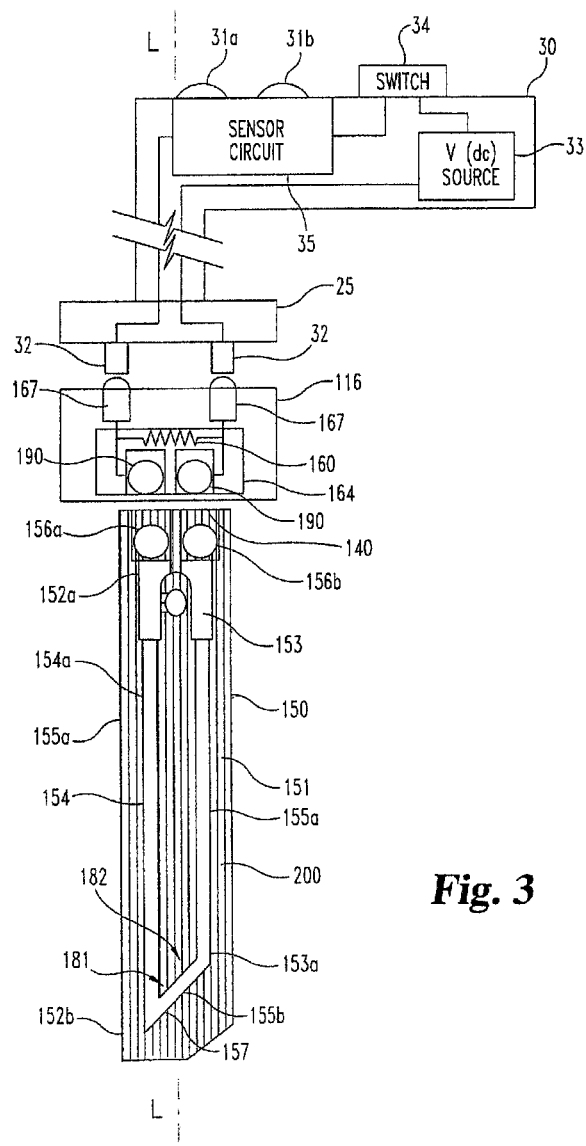
FIG. 3 is a partial diagrammatic, exploded sectional view of a portion of an interrogator and pest control device of the system of FIG. 1.

Referring to FIG. 3, a diagram illustrates certain electrical and related components of interrogator 30 and select portions of pest control device 110. In this representative embodiment, interrogator 30 includes an electrical power source 33, a switch 34, an indicator arrangement 31, and a sensor circuit 35. The power source 33 is illustrated as a direct current ("DC") power source but may also comprise an alternating current power source ("AC") in other embodiments. Power source 33 is connected with switch 34 and a respective one of the contacts 32. Switch 34 is also connected with sensor circuit 35. The sensor circuit 35 is electrically connected with indicator arrangement 31 and the other respective contact 32. Indicator arrangement 31 includes indicator 31a and indicator 31b. As previously set forth, contacts 32 are used to temporarily connect interrogator 30 with pest control devices 110 to interrogate pest control devices 110.

During the interrogation process, interrogator 30 is temporarily connected with contacts 32 of interrogator 30. Switch 34 may be depressed by pest control service provider P to apply a voltage across contacts 32 and cause an electrical flow therethrough. Sensor circuit 35 monitors current flow and/or a voltage level of circuitry 160 to send signals to indicator arrangement 31 that represent whether pests are present or not. As set forth in greater detail below, the current flow and/or voltage level of circuitry 160 changes as a function of whether or not pests have infested pet control devices 110.

Figure 4:
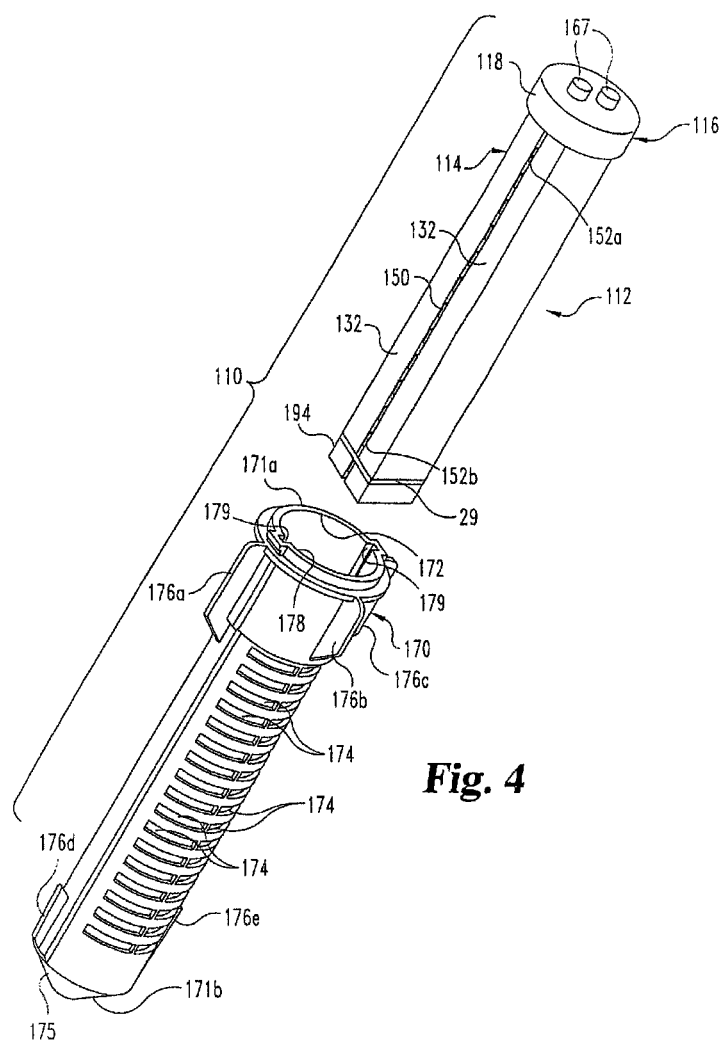
FIG. 4 is an exploded view of the pest monitoring device of the system of FIG. 1.

Referring to FIGS. 3 & 4, pest control devices 110 include pest monitoring assembly 112 and cap assembly 116. Pest monitoring assembly 112 includes sensor subassembly 114 below subassembly 116 along a vertical axis. Sensor subassembly 114 includes two (2) bait members 132 (see FIG. 4). Bait members 132 are each made from a bait material for one or more selected species of pests. For example, bait members 132 can each be made of a material that is a favorite food of such pests. In one example directed to subterranean termites, bait members 132 are each in the form of a soft wood block without a pesticide component. In other examples for termites, one or more of bait members 132 can include a pesticide, have a composition other than wood, or a combination of these features. In still other examples where pest control devices 110 are directed to a type of pest other than termites, a correspondingly different composition of each bait member 132 is typically used.

Sensor subassembly 114 also includes sensor 150. Sensor 150 is depicted between bait members 132 in FIG. 4. Sensor 150 is generally elongated and has a first end portion 152a opposite a second end portion 152b as shown in FIGS. 3 and 4. Sensor 150 includes substrate 151 extending along longitudinal axis L. Substrate 151 carries a conductor 153 that is arranged to provide a sensing element 153a in the form of an electrically conductive pathway 154 shown best in FIG. 3. Electrically conductive pathway 154 is defined with an electrically conductive ink trace 154a. Pathway 154 (and correspondingly trace 154a) includes a number of linear segments including elongate segments 155a that are generally parallel to axis L. Also included is segment 155b that connects segments 155a together. The electrically conductive ink trace extends from a first electrical contact pad 156a along substrate 151 to the second end portion 152b. At the second end portion 152b, electrically conductive pathway 154 defines a turn to reverse direction, returning to a second electrical contact pad 156b on first end portion 152a.

The electrically conductive ink trace 154a defines a chisel-shaped tip 157 at its terminal extent along axis L on the second end portion 152b of substrate 151. The electrically conductive ink trace includes at least two corners 181, 182 to reverse the direction, a first one of the bends 181 corresponding to an acute angle (an angle less than 90 degrees) and a second one of the bends 182 corresponding to an obtuse angle (an angle greater than 90 degrees). Collectively, the sum of the acute angle and the obtuse angle is about 180 degrees. It has been surprisingly discovered that forming the electrically conductive ink trace in a chisel-shaped pattern reduces false positive readings from pest control devices 110.

Substrate 151 and/or conductor 153 are oriented with respect to bait members 132 so that a certain degree of consumption or displacement of bait members 132 exerts a mechanical force sufficient to alter the electrical conductivity of pathway 154 in a detectable manner In one form, substrate 151 and/or conductor 153 are/is comprised of one or more materials susceptible to consumption or displacement by the pests being monitored with pest monitoring assembly 112. These materials can be a food substance, a nonfood substance, or a combination of both for the one or more pest species of interest. Indeed, it has been found that materials composed of nonfood substances will be readily displaced during the consumption of adjacent edible materials, such as bait members 132. As substrate 151 or conductor 153 are consumed or displaced, the resistance of pathway 154 is eventually altered. For example, the pathway 154 can be broken to provide an electrically open condition (high electrical resistance) that can be sensed to indicate a change in state of sensor 150. This alteration can be utilized to indicate the presence of pests by monitoring one or more corresponding electrical properties of pathway 154 as will be more fully described hereinafter. In another form, substrate 151 and/or conductor 153 are altered in a detectable fashion that need not be directly consumed or displaced by the pest of interest.

For the illustrated embodiment, substrate 151 is made of cellulose, namely a paper stock having a predefined directional grain structure designated by reference numeral 200 (or grain 200). Grain 200 represents a tendency of the fibers of the paper material to align more in one direction than in another direction. In a preferred embodiment, the grain 200 of substrate 151 is anisotropic directionally. For the illustrated arrangement, the grain alignment is more preferably anisotropic in favor of a direction generally along axis L. In an even more preferred form of this embodiment, grain 200 is structured so that a majority of the fibers of substrate 151 are approximately parallel to axis L and correspondingly are parallel to the longitude of segments 155a and the longitude of substrate 151. Accordingly, grain 200 is diagrammatically represented by a number of lines approximately parallel to axis L. In this embodiment, the elongate segments 155a are in an approximately parallel relationship with grain 200 of substrate 151. One supplier of this paper material is Potlatch Corporation under model number 2200R0P2S, which has a business address of 601 West First Avenue, Suite 1600, Spokane Wash., 99201 (potlatchcorp.com).

As illustrated, substrate 151 is coated with a hydrocarbon polymer, such as polyethylene, to name one nonlimiting example. Trace 154a is deposited on this coating in multiple layers. In one particular form, two layers are deposited before curing the ink. Surprisingly, it has been discovered that forming the electrically conductive ink trace 154a with this grain structural relationship reduces false positive readings from pest control devices 110. In one implementation it has been discovered that the grain structure of model 2200R0P2S paper oriented as shown in FIG. 3 tends to swell anisotropically when exposed to moisture. The swelling is greater in a direction approximately perpendicular to the longitudinal orientation of grain 200. Nonetheless, in other embodiments, a different paper grain structure, grain orientation, and/or substrate composition can be utilized, another nonlimiting example of which is illustrated in connection with FIG. 5 hereinafter. Furthermore, alternatively or additionally, a different coating may be used or could be absent.

In FIG. 3, pathway 154 comprises an electrically conductive carbon filled ink. Electrically conductive carbon-filled ink is used to print in-line resistors and may be custom blended to give specific resistance ranges. One such ink, referred to as "C-100", is a unique electrically conductive carbon filled hydrocarbon polymer ink designed for screen printing in flex circuit applications. Another such ink, referred to as "C-102" may also be used and is also an electrically conductive carbon-filled hydrocarbon polymer ink designed for printing in flex circuit applications. In one preferred embodiment, the resistance of pathway 154 is designed to have an electrical resistance less than 30 KiloOhms (kΩ). In a more preferred embodiment, this resistance is less than about 10 kΩ. In an even more preferred embodiment, the electrical resistance of pathway 154 is between about 4.5 and 6.5 kΩ. It has been discovered in laboratory studies that forming the electrically conductive ink trace using electrically conductive carbon-filled ink, and in particular, C-100, reduces false positive readings from pest control devices 110. The C-100 and C-102 inks are provided by Conductive Compounds, inc. having an address of 23 Londonderry Road, Suite 15, Londonderry, N.H., 03053 (conductivecompounds.com). C-100 is designed for screen printing in flex circuit applications. C-100 can also be thinned sufficiently with solvent to be utilized as a conductive coating for spray, dip or other coating applications. C-100 provides scuff resistance and has desirable adhesive characteristics with respect to both treated polyester and polyimide substrates. A desirable level of crease resistance is also provided when used on these substrates. C-100 is designed to balance between long open time during screen printing operations, and short drying time in subsequent drying applications. C-100 is compatible with specific silver inks, UV curable dielectrics, encapsulants, and conformal coatings. Various properties of C-100 are listed as follows in Table I:

TABLE I

| Appearance Viscosity: | Thixotropic Black Colored Paste |
|---|---|
| Brookfield #7RH spindle, 10 rpm | 50,000 cps |
| Brookfield #7RH spindle, 100 rpm | 10,800 cps |
| Thixotropic Ratio | 4.6 |
| Drying Schedule | <5 Minutes At 290° F. (May Be Longer Or Shorter Depending Upon Heat Source And Air Flow) |
| Shelf Life | 6 Months In Unopened Container |
| Total % NV Solids | 33% +/− 2% |
| Hegman Gage | <100.0μ |
| Volume Resistivity (ref. ASTM D-257) | 0.5 Ω-cm |
| Surface Resistivity | <75 Ω/Square |

Nonetheless, in other embodiments, a different kind of conductive ink (such as an ink with metallic particles) and/or different type of conductor could be utilized. The C-102 ink has also been tested and found to perform at least as favorably as C-100 ink.

Referring to FIG. 4, bait members 132 and sensor 150 can be held together at lower end portion 152b of sensor 150 using a fastener or securing device 29. The securing device 29 may be selected from a group of securing devices consisting of a zip tie, a clamp, at least one screw, a band, a strap, a rubber band, an elastic band, a staple, a piece of shrink wrap, and a clip. It has been discovered in laboratory studies that using at least one securing device 29 to securely connect bait members 132 with sensor 150 reduces false positive readings from pest control devices 110—in particular application of a zip tie or ratchet cable tie type of fastener.

Referring generally to FIGS. 3 and 4, pest monitoring assembly 112 further includes cap assembly 116 coupled to sensor subassembly 114. Cap assembly 116 is arranged such that contacts 32 located on interrogator 30 can communicate pest activity as indicated by a change in one or more electrical properties of pathway 154 of sensor subassembly 114. Cap subassembly 116 includes circuit enclosure 118 for housing resistor 160 (see FIG. 3) and a pair of electrically conductive connection members 140 for coupling circuitry 160 to sensor 150 of sensor subassembly 114. The interior of subassembly 116 may be encapsulated in a potting material. In one form sensor 150 is connected to place contacts 156a and 156b in electrically communication with members 140 by application of one or more screws though corresponding apertures defined by the substrate (not shown); however, in other embodiments, a different connection technique can be utilized. In one particular alternative, a detachable friction fit is used with an electrically conductive elastomeric rubber connector as disclosed in U.S. Pat. No. 6,724,312, filed Sep. 25, 2000. U.S. Pat. No. 6,724,312 is hereby incorporated by reference in its entirety. Once connected, pathway 154 is electrically connected in parallel with resistor 160.

Cap assembly 116 also includes contacts 167 to electrically couple with each of contacts 32 of interrogator 30. Correspondingly, contacts 32 establish an electrical connection across the parallel configuration of resistor 160 and pathway 154. As such, interrogator 30 is capable of providing an electric signal to device 110. It has been found that pest activity tends to cause pathway 154 to become electrically open, greatly increasing its electrical resistance. In one implementation, the resistance of pathway 154 is selected to be significantly lower than resistor 160. Accordingly, for an electrically closed state of pathway 154, a detectably higher current flow through contacts 32 results as compared to an electrically open state of pathway 154. This distinction can be used to detect the change of state with circuitry 35 and correspondingly change a visual output representative of the state with indicator arrangement 31. For example, when pathway 154 is electrically closed during interrogation with interrogator 30, then indicator 31a of indicator arrangement 31 is energized, which indicates that pests are not present. When pathway 154 is electrically open during interrogation with interrogator 30, pest activity presence is indicated by energizing indicator 31b of indicator arrangement 31. The activation of indicator 31a provides verification that contacts 32 have made appropriate contact with contacts 167; however, in other embodiments, such an indicator may be absent. In other embodiments, an indicator arrangement or any indicator of it may be of a different type or quantity and/or may be absent. In one different form, only one operator indicator is provided on pest control device 110 that is energized only when pests are present. Alternatively or additionally, circuitry provided in device 110 and/or interrogator 30 can differ. In one nonlimiting alternative, a passive RF transponder is included in device 110 in electrical communication with sensor 150, and interrogator 30 provides an active RF output to device 110 to stimulate and/or power its operation, and further receives an RF response from device 110. Such alternatives, as well as others, are described in U.S. Pat. No. 6,914,529 filed on Jun. 18, 2002. U.S. Pat. No. 6,914,529 is hereby incorporated by reference in its entirety.

Pest control device 110 includes housing 170 arranged for placement in the ground as shown, for example, in FIG. 2. Cap assembly 116 is configured to be removably connected with housing 170 to position the pest monitoring assembly 112 within the housing 170. Housing 170 defines chamber 172 intersecting opening 178. Pest monitoring assembly 112 is sized to be inserted into chamber 172 through opening 178. Housing 170 has end portion 171a opposite end portion 171b. End portion 171b includes tapered end 175 to assist with placement of each pest control device 110 in the ground as illustrated in FIG. 2. End 175 terminates in an aperture (not shown). In communication with chamber 172 are a number of slots 174 defined by housing 170. Slots 174 are particularly well-suited for the ingress and egress of termites from chamber 172. Housing 170 has a number of protruding flanges a few of which are designated by reference numerals 176a, 176b, 176c, 176d, and 176e in FIG. 4 to assist with positioning of pest control device 110 in the ground.

Once inside chamber 172, pest monitoring assembly 112 can be secured in housing 170 with cap assembly 116. It is preferred that base 130, cover piece 120, and housing 170 be made of a material resistant to deterioration by expected environmental exposure and resistant to alteration by the pests likely to be detected with pest control device 110. In one form, these components are made from a polymeric resin like polypropylene or CYCOLAC AR polymeric plastic material available from General Electric Plastics, having a business address of One Plastics Avenue, Pittsfield, Mass. 01201.

Typically, pest monitoring assembly 112 is placed in chamber 172 after housing 170 is at least partially installed in the ground in the region to be monitored. In one mode of operation, pest control device 110 is reconfigured to deliver a pesticide after pest activity is detected with pest monitoring assembly 112. In this arrangement, at least one bait member 132 is replaced with pesticide after pest activity has been detected. Substitution begins by rotating cap 116 in a direction opposite that required to latch it, and removing cap assembly 116 from housing 170. Typically, the removal of cap assembly 116 is performed with housing 170 remaining at least partially installed in the ground. Pest monitoring assembly 112 is then extracted from housing 170.

The operating principles of the present application are applicable to various other embodiments of other published patent applications and/or issued patents owned by the assignee of the present application, Dow AgroSciences LLC. For example, the principles of the present application may be utilized in various sensors and/or monitoring arrangements, among other things, as disclosed in the following items. U.S. Pat. No. 6,914,529, filed Jun. 18, 2002, U.S. Pat. No. 6,724,312, filed Sep. 25, 2000, U.S. Pat. No. 7,212,112 filed Apr. 3, 2005, U.S. Pat. No. 7,212,129 filed Mar. 21, 2002, U.S. Pat. No. 7,262,702 filed Aug. 9, 2001, U.S. Published Patent Application No. 2001/0033230, filed Mar. 20, 2001, U.S. Published Patent Application No. 2001/0009399, filed Mar. 28, 2001, International Patent Application Number PCT/US03/08690, filed Mar. 21, 2003, International Patent Application No. PCT/US02/24186, filed on Jul. 31, 2002, International Patent Application Number PCT/US99/16519, filed Jul. 21, 1999, all of which are hereby incorporated by reference in their entirety.

During operation, interrogator 30 is positioned such that a stimulation signal may be applied to device 110. In the embodiment illustrated, the contacts 32 of interrogator 30 are connected with contacts 167 of device 110. In the illustrated embodiment, each contact 167 protrudes from device 110 as a rounded boss, and is made of an electrically conductive elastomer. Once connected, a stimulation signal is applied to device 110 to determine if the electrically conductive pathway 154 is broken. If the pathway 154 is open, a signal is provided to indicator 31a indicating pests are not present, and if the pathway 154 is broken, a signal is provided to indicator 31b indicating that pests are present. The stimulation signal is applied by depressing switch 34 on interrogator 30. The stimulation signal allows current to flow through circuitry 160, which comprises a resistor connected in parallel with pathway 154, and the sensor circuit 35 is configured to detect if pathway 154 is broken.

In other alternative embodiments, device 110 and corresponding interrogators, data collection units and data collectors may be used in various different combinations as would occur to one skilled in the art. While Interrogator 30 is shown in a hand-held form, in other embodiments, an interrogator can be in a different form, carried by a vehicle, or installed in a generally permanent location. Indeed, a data collection unit can be utilized to directly interrogate/receive information from a pest control device. Also, while bait for device 110 may be provided in an edible form suitable for termites, a bait variety selected to control a different type of pest, insect or non-insect, may be selected and the device housing and other characteristics adjusted to suit monitoring and extermination of the different type of pest. Moreover, bait for device 110 may be of a material selected to attract the targeted species of pest that is not substantially consumed by the pest. In one alternative, one or more pest control devices include non-food material that is displaced or altered by targeted pests. By way of nonlimiting example, this type of material may be used to form a non-consumable sensing member substrate with or without consumable bait members. In a further alternative, one or more pest control devices according to the present invention lack a housing, such as housing 170 (and correspondingly cap assembly 116). Instead, for this embodiment the housing contents may be placed directly in the ground, on a member of a building to be monitored, or arranged in a different configuration as would occur to those skilled in the art. Also, any of the pest control devices of the present invention may be alternatively arranged so that bait consumption or displacement of a sensing member causes movement of a conductor to close an electrical pathway instead of causing an open circuit.

Pest control devices based on wireless communication techniques may alternatively or additionally include hardwired communication connections to interrogators, data collection units, data collectors, or such other devices as would occur to those skilled in the art. Hardwired communication may be used as an alternative to wireless communication for diagnostic purposes, when wireless communication is hampered by local conditions, or when a hardwired connection is otherwise desired.

Figure 5:
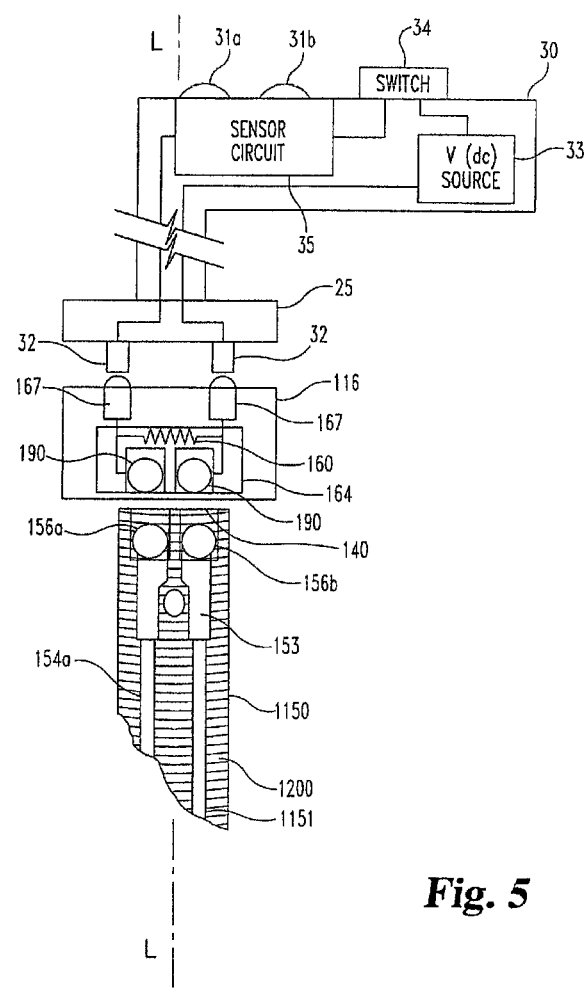
FIG. 5 is a partial diagrammatic, exploded sectional view of a portion of an interrogator and another embodiment of pest control device.

Referring to FIG. 5, another embodiment is illustrated depicting sensor 1150; where like reference numerals identify like features. Sensor 1150 includes substrate 1151, which is made of cellulose material, namely a paper stock, that has a predefined directional grain structure designated by reference numeral 1200 (or grain 1200). Grain 1200 represents a tendency of the fibers of the paper material to align more in one direction than in another direction different than that shown in FIG. 3. For the illustrated arrangement, the grain alignment is anisotropic in favor of a direction transverse to axis L, such that a majority of the fibers of substrate 1151 may be oriented approximately perpendicular to axis L. Accordingly, grain 1200 is diagrammatically represented by a number of lines approximately orthogonal to axis L. This grain structure may be desired to take advantage of one or more properties of substrate 1151 that behave anisotropically with respect to grain 1200. As illustrated, substrate 1151 is coated with a hydrocarbon polymer, such as polyethylene, to name one nonlimiting example. Similar to substrate 151 discussed above, trace 154a is deposited on the coating of substrate 1151 in multiple layers. In one particular form, two layers are deposited before curing the ink.

A further embodiment includes: installing a plurality of pest detection devices at least partially in the ground, the pest detection devices each including: one or more bait members structured to be consumed or displaced by one or more pests and a detection device positioned proximate to the one or more bait members, the detection device including a substrate with a first end portion opposite a second end portion and an electrically conductive ink trace carried on the substrate, the trace defining two contacts spaced apart from one another on the first end portion, the trace extending from a first one of the contacts along the substrate to the second end portion and reversing direction on the second end portion to return to a second one of the contacts on the first end portion, the electrically conductive ink trace defining a chisel-shaped tip along the second end portion; performing an interrogation of each of the pest detection devices with a signal to determine an electrical conductivity state of the trace; and determining if pests are present based on the interrogation. In one implementation, the electrically conductive ink trace includes at least two corners to reverse the direction on the second end portion, a first one of the corners corresponding to an acute angle and a second one of the corners corresponding to an obtuse angle; and/or the substrate includes a polymer-coated paper material with a predefined grain oriented approximately parallel to a longitudinal axis of the substrate.

In still a further embodiment, a plurality of pest detection devices each include: one or more bait members structured to be consumed or displaced by one or more pests and a detection device positioned proximate to the one or more bait members, the detection device including a substrate with a first end portion opposite a second end portion and an electrically conductive ink trace carried on the substrate, the trace defining two contacts spaced apart from one another on the first end portion, the trace extending from a first one of the contacts along the substrate to the second end portion and reversing direction on the second end portion to return to a second one of the contacts on the first end portion, the electrically conductive ink trace defining an chisel-shaped tip along the second end portion; means for performing an interrogation of each of the pest detection devices with a signal to determine an electrical conductivity state of the trace; and means for determining if pests are present based on the interrogation.

Yet a further embodiment includes: a housing structured for installation at least partially below ground, the housing defining one or more openings in communication with material under the ground surface when the housing is installed in the ground; one or more bait members positioned in the housing and being structured for consumption or displacement by one or more pests; and a sensor positioned in the housing in close proximity to the one or more bait members, the sensor including a substrate and an electrically conductive ink trace extending from two contacts at a first end portion of the substrate to a second end portion of the substrate, the ink trace following a pathway defining a turn that reverses direction on the second end portion to connect the contacts together, the turn defining a corner subtending an acute angle between respective adjoined line segments of the ink trace. In one implementation, this embodiment includes: the turn further defining another corner subtending an obtuse angle between connected segments of the ink trace; the trace comprising a carbon filled electrically conductive ink coating material; the trace having a resistance preferably less than 30,000 ohms, more preferably less than 10,000 ohms, and even more preferably between approximately 4500 and 6500 ohms; the substrate including a directional grain structure oriented along a longitudinal axis of the substrate; and/or the substrate including a paper material coated with a hydrocarbon polymer.

Another embodiment comprises a plurality of pest detection devices each including: a housing structured for installation at least partially below ground surface, the housing defining one or more openings in communication with material under the ground surface when the housing is installed in the ground; one or more bait members positioned in the housing and being structured for consumption or displacement by one or more pests; and a sensor positioned in the housing in close proximity to the one or more bait members, the sensor including a substrate comprised of a paper material with a directional grain structure responsive to moisture to anisotropically change dimension of the substrate, a polymeric material at least partially coating the substrate, and an electrically conductive pathway defined along the substrate to extend from each of two electrical contacts at a first end portion of the substrate to a second end portion of the substrate, the pathway defining a turn that reverses direction on the second end portion to connect the contacts together.

In another embodiment, an apparatus includes: a housing structured for installation at least partially below ground surface, the housing defining one or more openings in communication with material under the ground surface when the housing is installed in the ground; one or more bait members positioned in the housing and being structured for consumption or displacement by one or more pests; and a sensor positioned in the housing in close proximity to the one or more bait members, the sensor including a substrate and an electrically conductive ink trace including two elongate segments each extending from a different one of two contacts at a first end portion of the substrate to a second end portion of the substrate, the ink trace following a pathway defining a turn that reverses direction on the second end portion to connect the contacts together, and the substrate being comprised of a paper material with a directional grain structure oriented with respect to the elongate segments of the ink trace.

Still another embodiment comprises: monitoring for one or more pests with a sensor including a substrate carrying an electrically conductive pathway defined by applying at least two layers of a carbon-containing electrically conductive ink, the electrically conductive pathway having an electrical resistance less than 30,000 ohms, the sensor being positioned between two bait members in a housing installed at least partially below ground; interrogating the sensor by applying an interrogation signal to determine if the electrically conductive pathway is in an electrically open or electrically closed state; and from the electrically open or electrically closed state, determining if the one or more pests are present. In one implementation, the substrate defines a directional grain structure oriented along at least one of a longitudinal axis of the substrate and longitude of an elongate segment of the pathway, the ink is comprised of a C-100 or C-102 material, the pathway turn defines a corner terminating in a chisel-shaped tip, and/or the turn defines a first corner defining an acute angle and a second corner defining an obtuse angle.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary. While the invention has been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein or by any of the following claims are desired to be protected.

What is claimed is:

1. A method comprising:
   inserting a pest detection device at least partially in the ground such that an electrically conductive ink trace of the pest detection device extends downwardly from two spaced apart electrical contacts to a downwardly-pointed, chisel-shaped tip, the pest detection device including a bait member positioned proximate to the trace, performing an interrogation of the pest detection device with a signal to determine an electrical conductivity state of the trace, and determining a presence of a pest based on the interrogation, wherein inserting the pest detection device further includes:

inserting a bottom end of a housing of the pest detection device into the ground, and inserting the bait member and the electrically conductive ink trace into the housing such that the downwardly-pointed, chisel-shaped tip is pointed toward the bottom end of the housing.

2. The method of claim 1, wherein the pest detection device includes a substrate that carries the trace and defines a vertically-extending longitudinal axis.

3. The method of claim 2, further comprising permitting the pest to consume a portion of the substrate.

4. A method comprising:

inserting a pest detection device at least partially in the ground such that an electrically conductive ink trace of the pest detection device extends downwardly from two spaced apart electrical contacts to a downwardly-pointed, chisel-shaped tip, the pest detection device including a bait member positioned proximate to the trace, performing an interrogation of the pest detection device with a signal to determine an electrical conductivity state of the trace, and determining a presence of a pest based on the interrogation, wherein, when the pest detection device is inserted at least partially in the ground:

the pest detection device includes a substrate that carries the trace and defines a vertically-extending longitudinal axis, the trace includes a first elongate segment extending downwardly from a first contact of the spaced apart electrical contacts to a lower end, a second elongate segment extending downwardly from a second contact of the two spaced apart contacts to a lower end, and a third elongate segment extending between the lower end of the first elongate segment and the lower end of the second elongate segment, and the downwardly-pointed, chisel-shaped tip is defined by the first elongate segment and the third elongate segment.

5. The method of claim 4, wherein an acute angle is defined between the first elongate segment and the third elongate segment.

6. The method of claim 4, wherein the first elongate segment and the second elongate segment extend parallel to the longitudinal axis.

7. The method of claim 1, further comprising generating a visible indication if the one or more species of pest are present.

8. The method of claim 1, wherein performing the interrogation of the pest detection device includes connecting an interrogator with two electrical terminals in electrical communication with the spaced apart electrical contacts.

9. The method of claim 8, wherein performing the interrogation includes activating a switch to apply electricity to the trace.

10. The method of claim 1, wherein determining the presence of the pest including monitoring electrical properties of the trace.

11. A pest detection device comprising:

a bait member structured for consumption or displacement by one or more pests; and a sensor positioned proximate to the bait member, the sensor including a substrate, and an electrically conductive ink trace carried on the substrate, the trace extending downwardly from a pair of spaced apart electrical contacts to a downwardly-pointed, chisel-shaped tip, wherein the trace includes:

a first elongate segment extending downwardly from a first electrical contact of the spaced apart electrical contacts to a lower end, a second elongate segment extending downwardly from a second electrical contact of the two spaced apart electrical contacts to a lower end, a third elongate segment extending between the lower end of the first elongate segment and the lower end of the second elongate segment, the third elongate segment being angled relative to the first elongate segment and the second elongate segment, and wherein the downwardly-pointed, chisel-shaped tip is defined by the first elongate segment and the third elongate segment.

12. The pest detection device of claim 11, wherein an acute angle is defined between the first elongate segment and the third elongate segment.

13. The pest detection device of claim 11, wherein the first elongate segment and the second elongate segment extend parallel to a longitudinal axis defined by the substrate.

14. A pest detection device comprising:

a bait member structured for consumption or displacement by one or more pests;

a sensor positioned proximate to the bait member, the sensor including a substrate, and an electrically conductive ink trace carried on the substrate, the trace extending downwardly from a pair of spaced apart electrical contacts to a downwardly-pointed, chisel-shaped tip; and a housing having a chamber defined therein, wherein the sensor is positioned in the housing such that the downwardly-pointed, chisel-shaped tip is pointed toward a bottom end of the chamber.

15. The pest detection device of claim 11, wherein the substrate comprises a paper material with a directional grain structure responsive to moisture to anisotropically change the substrate dimensions.

16. The pest detection device of claim 15, wherein the substrate comprises a polymeric material at least partially coating the substrate.

* * * * *